United States Patent [19]

Kemp et al.

[11] Patent Number: 5,600,997
[45] Date of Patent: Feb. 11, 1997

[54] CARRIER FREQUENCY SENSING OF FLUIDS IN VESSELS

[75] Inventors: William H. Kemp, Clayton; Victor J. Shideler, Carleton, both of Canada

[73] Assignee: ITT Corporation, Harrison, N.Y.

[21] Appl. No.: 513,704

[22] Filed: Aug. 11, 1995

[51] Int. Cl.⁶ .................................................. G01F 23/28
[52] U.S. Cl. ........................................ 73/290 V; 340/621
[58] Field of Search ............................. 73/290 V, 1 DV; 116/109, 227; 340/621, 612, 618, 450, 450.1, 450.2, 450.3, 620

[56] References Cited

U.S. PATENT DOCUMENTS 3,706,980  12/1972  Maltby ................................... 340/620
5,437,178  8/1995  Esin ........................................ 73/1 DV Primary Examiner—Christine K. Oda
Attorney, Agent, or Firm—Menotti J. Lombardi

[57] ABSTRACT

A carrier frequency based system employs a capacitive probe which is located at a predetermined desired fluid detection level in a fluid containing vessel. The probe forms one plate of a capacitor where the other plate is formed by the fluid in which the probe is immersed. A carrier frequency is injected into the fluid by means of a suitable oscillator and at a frequency which is close to the system resonant frequency. When the probe is immersed in fluid, the probe will receive a predetermined carrier frequency of an amplitude determined by the system. The output of the probe is coupled to suitable sensing circuits which monitor the amplitude of the signal frequency coupled to the probe. When the fluid level recedes and therefore a portion of the probe or the total probe is out of fluid, the capacitance of the system changes. A different signal from the injected carrier frequency is now applied to the probe indicating to the sensing circuit that the probe is not immersed and therefore indicating an alarm condition. The output of the sensing circuit is monitored by control circuitry which can operate an alarm indicating to the user that the probe is not fluid immersed and that preventive measures should be taken. The fluid sensing probe utilizing the carrier injected frequency can discriminate between fluid and foam, "probe fouling" and probe shorting and is relatively fail proof.

18 Claims, 3 Drawing Sheets

CARRIER FREQUENCY SENSING OF FLUIDS IN VESSELS

BACKGROUND OF THE INVENTION

This invention relates to a sensing device to monitor the level of a liquid in a vessel and more particularly, to an apparatus and a method for detecting the level of a liquid utilizing a propagated carrier frequency.

As one can ascertain, the prior art is replete with many devices which operate to monitor the fluid level in a tank or other storage vessel. Many devices operate by means of an electromechanical switch which is activated by a float. The float rides or floats on the surface of the liquid, and when the liquid reeves to a given value, a switch coupled to the float is operated. These types of devices are subject to sticking in either the on or off position. Most of the devices are operated so that they control a pump or other means for controlling the level of fluid in a storage tank or vessel. Thus, if such a switch sticks in the closed position, it will cause the pump to continue to operate and create problems. On the other hand, if the switch locks in the open position this can cause flooding or overflow because the pump or other device will not operate. Such system failures are well known and occur in many instances.

There are other systems which utilize electrical or electronic devices to detect the level of fluid in a vessel or otherwise. Such devices are also well-known. In any event, the detection of fluid in such vessels is extremely important in many different applications. A particular application is to monitor the fluid level in a steam boiler. The function of such a device is to open a set of electrical contacts in the event of a low water condition in the boiler, thereby shutting down the burner and protecting the boiler against thermal damage or fire. Approximately two million residences in the United States are heated using low pressure steam. There is a significant demand for replacement boilers and associated controls and each of these boilers must be outfitted with a low water cutoff device to prevent the above-noted problems.

As indicated, many of the prior art devices use float-type controls. Electronic low-water cutoff devices have been available from many different manufacturers. As will be explained below, certain of these devices have serious problems in the reliable sensing of fluid levels.

It is of course understood that a major consideration in the design or operation of any such device is reliable, fail-safe operation at relatively high temperatures which device should also be easy to install while being economical and reliable.

It is an object of the present invention to provide a low-water cutoff device or fluid level detector employing a carrier frequency sensing technique.

BRIEF DESCRIPTION OF THE PREFERRED EMBODIMENT

A liquid level detection apparatus for monitoring the level of a fluid volume in a storage tank or vessel, comprising a probe positioned at a given level in said vessel indicative of a desired fluid level at which said probe is immersed in said fluid at said level; means for injecting a carrier frequency signal into said fluid as contained in said vessel to cause said frequency to propagate to said probe; means coupled to said probe for monitoring the presence of said carrier signal and responsive to the amplitude of said signal to provide a control signal when said amplitude is below a given value.

DETAILED DESCRIPTION OF THE INVENTION

Figure 1:
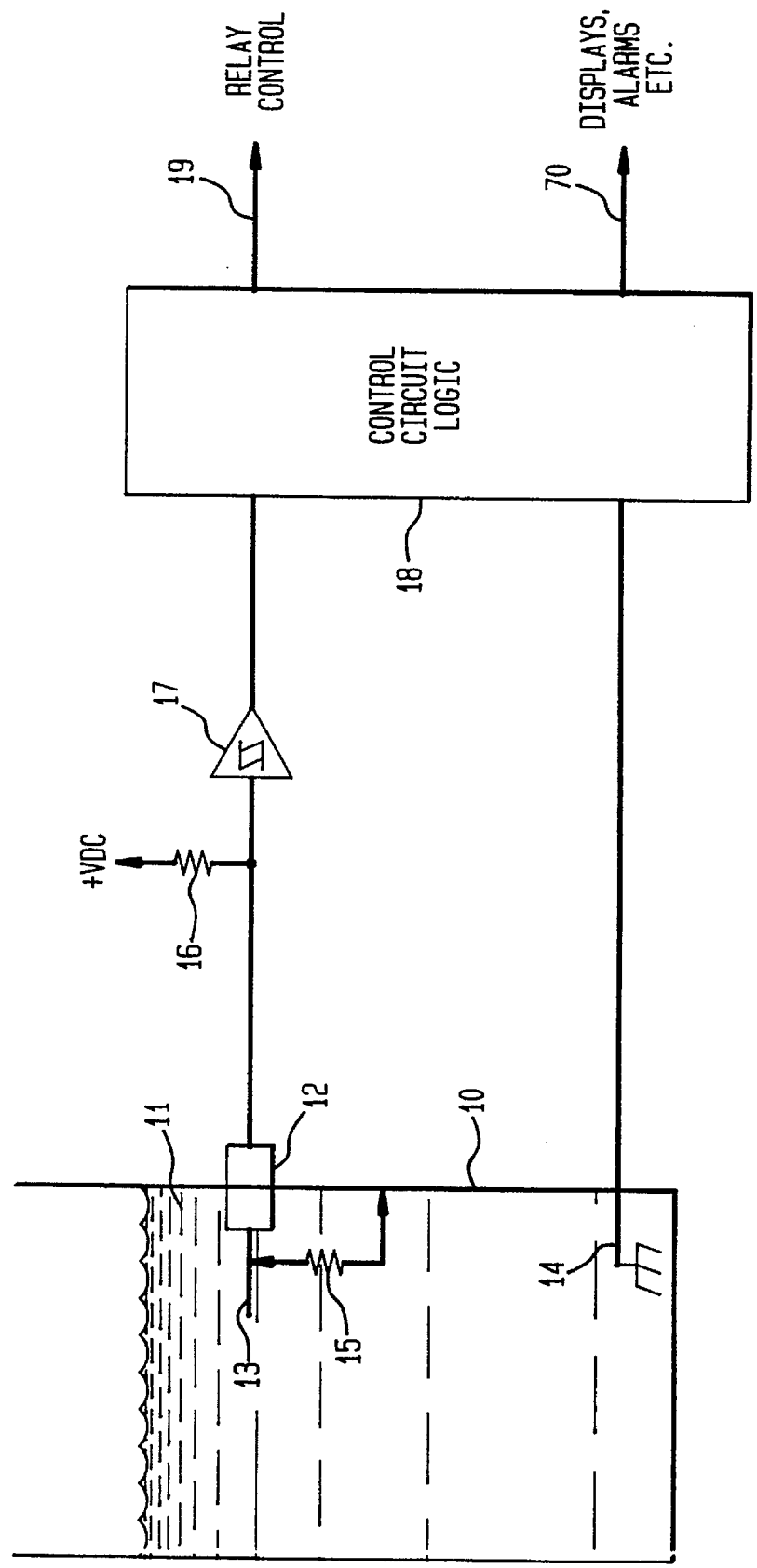
FIG. 1 is a schematic diagram depicting a conductive low water cutoff circuit according to the prior art.

FIG. 1 is employed to describe a widely used prior art technique for measuring the liquid level in a vessel. Before describing the details of FIG. 1, it is indicated that conductive and capacitive sensing of a fluid level in a vessel is known in the prior art. Commercially available sensors have fluid detection modes which under certain conditions may cause the sensor to incorrectly sense fluid. This shortcoming has limited the use of these sensing means to applications where a detection error of the sensor will not create a system or an operational error. In regard to such prior art devices, reference is made to FIG. 1. It is again indicated that the ability to sense fluid by conductive or capacitive sensing means and provide a single output indicating the presence or absence of a fluid at a monitored level in the vessel and to prevent the failure of the probe detection circuit in all modes of operation is uncertain based on prior art techniques.

Referring to FIG. 1, there is shown a vessel 10 which may be any conventional vessel such as a steam boiler or any vessel or storage tank for holding a fluid 11. In the event of a steam boiler, the fluid 11 is water, but other types of fluids can be detected as well. As seen in FIG. 1, a metal probe 13 is inserted into the vessel 10 at a desired fluid monitoring level. The probe 13 is insulated from the vessel 10 by means of a non-conductive housing 12 which may be a plastic housing or otherwise is insulated by many well-known techniques. The probe 13 or detector can be a simple single wire probe or any other probe. For example, an immersion probe exhibits a low impedance when inserted into a fluid. When the probe is removed from the fluid the impedance becomes higher. Many examples of such immersion probes are well-known and such devices are reliable and relatively inexpensive. A second ground connection 14 to the vessel 10 is made. The vessel 10 for example may be an insulated or lined tank and the ground connection may be made with a second probe or other conductive/connective means to provide a conductive path with the fluid. Such techniques are well-known. The arrangement of FIG. 1 allows electrical current to flow through the probe 13 through the fluid 11 back to the ground point and this current flow occurs when liquid 11 is located between the ground point 14 and the probe 13. Water and other liquids are electrically conductive and therefore there is a current flow between the metal wire 13 and the ground 14 when a potential such as that supplied from the VDC source via resistor 16 is applied to the metal probe wire 13. The current flow from the DC source through resistor 16, through the probe wire 13, through the fluid 11 and back to ground 14 is detected by means of a buffer amplifier or circuit 17. The circuit 17 has an output connected to an input of a control circuit logic module 18. The logic module 18 operates to monitor the output of the buffer 17 and for a desired liquid level, a relay or control circuit is operated via output lead 19. If the probe 13 becomes uncovered due to a low liquid level, the electrical circuit is broken as there is no current flow. The buffer 17 detects a voltage transition or the absence of current flow at its input and produces an output which essentially is indicative of an absence of an electrical current flow through the fluid 11 contained in the vessel 10. The output of the buffer 17 indicates this condition to the control logic circuit which then produces an alarm or other display on lead 70.

It is of course understood that the control circuit logic 18 can be implemented by a microprocessor or many other devices. The output lead 19 designated as RELAY CONTROL may control a pump which will pump water into the system until the desired level is reached or may include many other devices such as heating devices and so on. The probe arrangement depicted in FIG. 1 works well in most instances.

However, one operational mode can cause the probe wire 13 to erroneously detect fluid. When fluid 11 is present in the vessel 10, current flows through the fluid 11 which flow is detected by the buffer 17 causing a fluid presence signal to be provided at the output lead 19. However, during the operation of such systems over a prolonged time, a deposit of rust, alkali or other substance buildup can occur in the area depicted by reference numeral 15. This substance can be represented by a resistor 15. The resistor 15, as shown, is due to the deposit or buildup of unwanted substances. And as one can see, the resistor 15, creates an electrical path between the probe 13 and the vessel or ground terminal 14. Thus, a current will flow between the vessel ground 14 and the wire detection probe 13 due to resistor 15. The buffer 17 will interpret this signal as a detected fluid and thus indicate that the probe 13 is immersed. If the control unit 18 uses this signal to ignite a gas boiler an operational error will occur and this will present an incorrect signal on output lead 19. Detecting this type of "probe fouling" has proved impractical for the following reasons. The fluid 11 represents a varying degree of electrical conductivity to the buffer circuit 17. That is the presence of fluid 11 may be indicated through a large change in conduction causing wide current flow variations. This is due to the different nature of the fluid, as determined by the amount of impurities, minerals, salt deposits and so on.

"Probe fouling" may be caused by a varying degree of material buildup that likewise has a very large change in electrical conductivity. Thus, a typical prior system cannot distinguish between the conductivity differences in the fluid 11 and the nature of the buildup as indicated by resistor 15.

The change in conductivity between the fluid and unsatisfactory fouling buildup may overlap. Therefore, in such a condition for any given fluid, there exists a range of conductivity where the fluid level and the failure buildup material indicative of resistor 15 exhibits the same exact electrical characteristics. Thus, the circuit 18 cannot distinguish between an actual residue buildup as manifested by resistor 15 or a change in electrical conductivity of fluid 11. It is sufficient to say that there is an area of failure which can be due to the differences in conductivity of the fluid and of the buildup of rust or alkali. The prior art system such as that depicted in FIG. 1 cannot distinguish between these differences and therefore operational system failures can and do occur.

Figure 2:
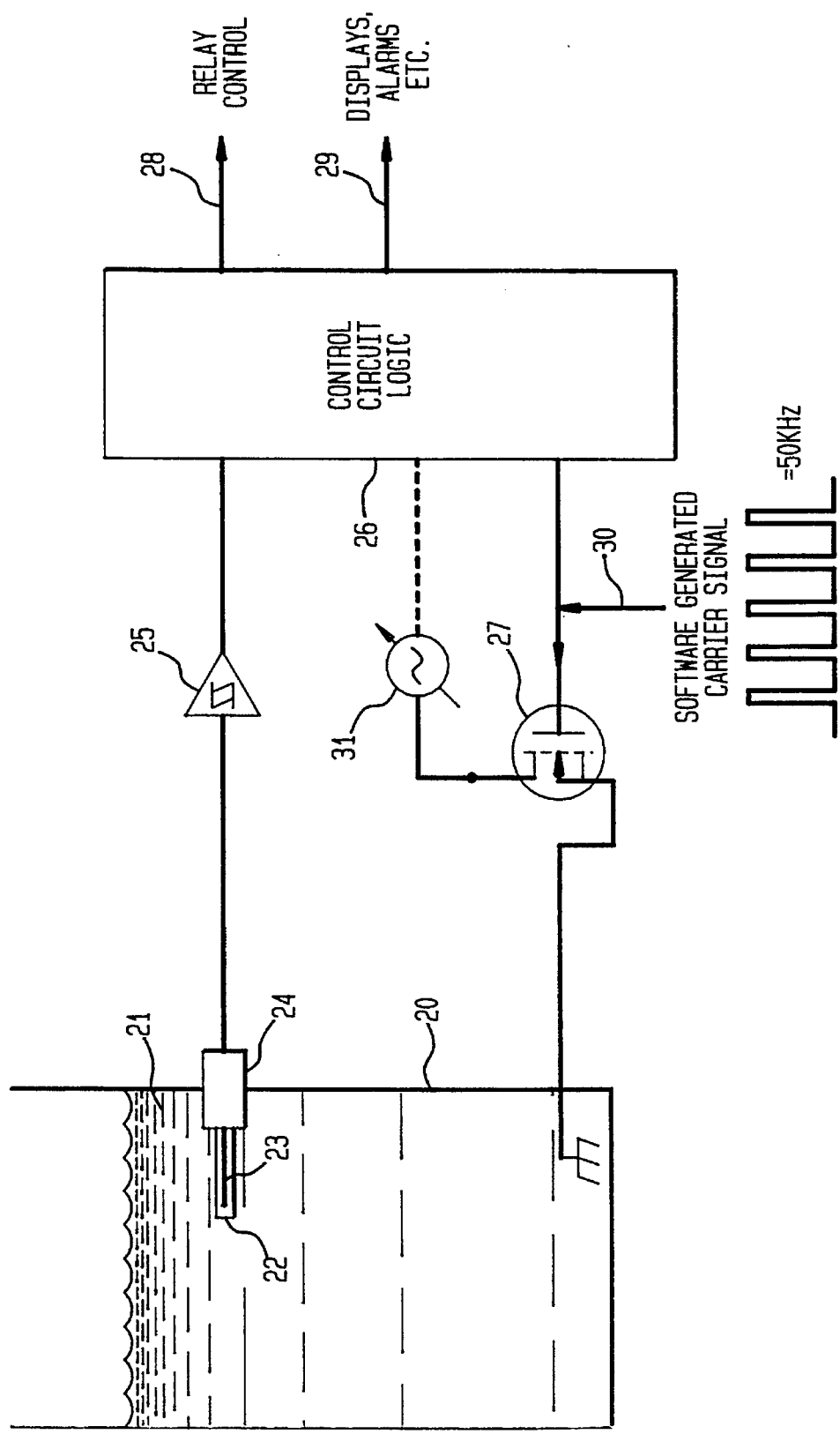
FIG. 2 is a schematic diagram depicting a carrier frequency injection low water cutoff system according to this invention.

Referring to FIG. 2, there is shown a monitoring system using a carrier frequency technology according to this invention. As seen in FIG. 2 there is a vessel 20 which again contains a suitable liquid 21. In the case of a boiler, the vessel 20 would be the steam boiler while the liquid 21 would be water. A probe 24 is again positioned in the vessel 20 according to a desired fluid level to be monitored. The probe 24 has a housing and includes a wire or elongated conductive member 23 which, in this case, is surrounded by a thin nonconductive or insulator jacket. In this manner, the wire 23 with the surrounding insulating jacket comprises one plate of a capacitor. An additional plate of the capacitor is created between the water and the inner conductive probe wire 23. Essentially the water or fluid 21 acts as the other plate or pad of the capacitor. Capacitance is the property of a system of conductors and dielectrics that permits the storage of electrically separated charges when a potential difference exists between the conductors. Thus, a capacitor is any device consisting of conductors separated by a dielectric, which may be air or vacuum, for introducing capacitance into an electric circuit or system for providing the storage of electric charge. The capacitance formed can be employed to receive transmitted electrical energy as will be explained. The nonconductive jacket 22 serves to isolate the probe wire 23 and can be fabricated from any conventional plastic material and may, for example, be a typical dielectric as polystyrene, polycarbonate, polyethylene, a TEFLON plastic material or various other nonconductive, insulator materials. The capacitor is created between the water or liquid 21 and the inner conductive probe wire 23. Again the inner conductive probe wire 23 is connected to the input of a buffer circuit 25 which, for example, may be an operational amplifier a Schmitt trigger, a comparator or other well-known circuit. A capacitor utilized as a probe can also be used to sense or determine fluid level by varying the capacitive effect and hence for example, the capacitor probe can be used in conjunction with an oscillator or a frequency selective network to produce a varying capacitance effect upon change in water level. A capacitor sensing probe suffers from the same exact problems as the conductive probe sensing means described in FIG. 1. The above problems which relate to substance buildup and so on also effect the operation of a capacitive sensing probe.

According to the present invention, a carrier frequency is injected into the fluid 21 contained in the vessel 20. There is shown a field-effect transistor 27 which has a gate electrode coupled to an output of the control circuit logic 26. Shown coupled to the gate electrode is a generated carrier signal 30 which consists of a series of pulses at a frequency, for example, of 50 khz. This frequency is selected by way of example and other frequencies can be utilized as well. While the field-effect transistor 27 is shown having its gate electrode coupled to the software generated carrier signal, it is also understood that the field-effect transistor can be used to form or operate with a variable frequency oscillator 31. The oscillator 31 provides a carrier frequency which is injected into the fluid 21. The FET circuit 27 for injecting a carrier frequency into the fluid 21 is strictly by way of example and many other devices, as oscillators, generators and so on can be used as well. The drain electrode of the field-effect transistor 27 is coupled to the ground electrode associated with the vessel 20. The vessel 20 may be insulated and therefore the ground would be a separate terminal or the vessel 20 may be conductive where the ground may be the actual vessel itself. The frequency which is applied to the gate electrode 27 or which is generated by means of the oscillator 31 is injected into the fluid 21. The fluid 21, such as water, is a conductor and hence the high frequency carrier signal would be coupled to the probe via the fluid. This coupling of the carrier frequency to the probe or to the probe wire enables this frequency to be provided at the input of the buffer circuit 25 where it is detected at the output and monitored by the control circuit logic 26. It is well known that the capacitance of such a probe 24 will remain constant due to the fact that the probe surface area does not change. Essentially, the probe surface area functions as one plate of a capacitor. If conductive failure material were built-up or positioned on the surface of the probe, it would not effect the capacitance. Therefore, the high frequency signal which is injected into the fluid would be capacitively coupled into the probe 24 and sensed by the buffer circuit 25. If fluid were not present, the carrier frequency would not couple to the probe and in this manner, the probe would be considered out of fluid. It is of course noted that the carrier frequency and the deposition buildup are important in determining the amplitude of the carrier frequency to be detected in order to provide adequate monitoring. As shown in FIG. 2, the carrier frequency is injected by means of the power field-effect transistor 27. The software generated carrier signal, which is depicted at 50 khz, is selected according to the probe and the liquid contained in the vessel 20. It is known that many systems which utilize reactive impedances have a resonant frequency associated with the system. Resonance occurs due to system impedance including capacitance and inductance and so on. In this manner, the entire system which consists of the capacitor probe 24, the vessel 20 and the fluid 21 has a resonant frequency or a frequency at which the probe capacitor is particularly responsive to. A frequency generator, such as a tunable generator may be is employed to determine the carrier frequency which provides the highest output from the probe when the probe is immersed in the fluid 21. By using this resonant frequency, one can obtain much greater conductivity from the components and hence one can monitor a substantial drop off in the magnitude of the signal coupled to the buffer circuit 25. For example when excessive amounts of material are built up on the probe this reduces the amount of signal coupled to the probe that the system can still respond. In this manner, even though the probe is still immersed in water and receiving the injected frequency, the system can determine that the signal output from the probe is such that the probe should be cleaned or otherwise attended to. Furthermore, when using a resonant frequency, one can obtain greater selectivity and be assured that system operation is always adequate as will further be explained. The control circuit logic 26 provides a relay control output on lead 28. This output is provided when the probe is in or out of the water depending on the particular application. As indicated, a relay control circuit can control the operation of a pump which may continue to pump water out of the vessel until the probe is exposed and then the relay will be energized, thus shutting the pump off. In a similar manner, the relay control may operate a gas burner, in the case of a boiler, or may operate various other mechanisms depending upon the application. When the probe is out of the water or the probe is exposed, there will be no frequency coupled to the probe, or the amount of energy coupled to the probe is decreased to a level where it is clear that the probe is not in water. In this manner, a display or an alarm signal would be provided on lead 29 indicating to the system operator that the probe is out of the water and that a problem condition exists. The system operator may use his discretion to repair the problem.

Figure 3:
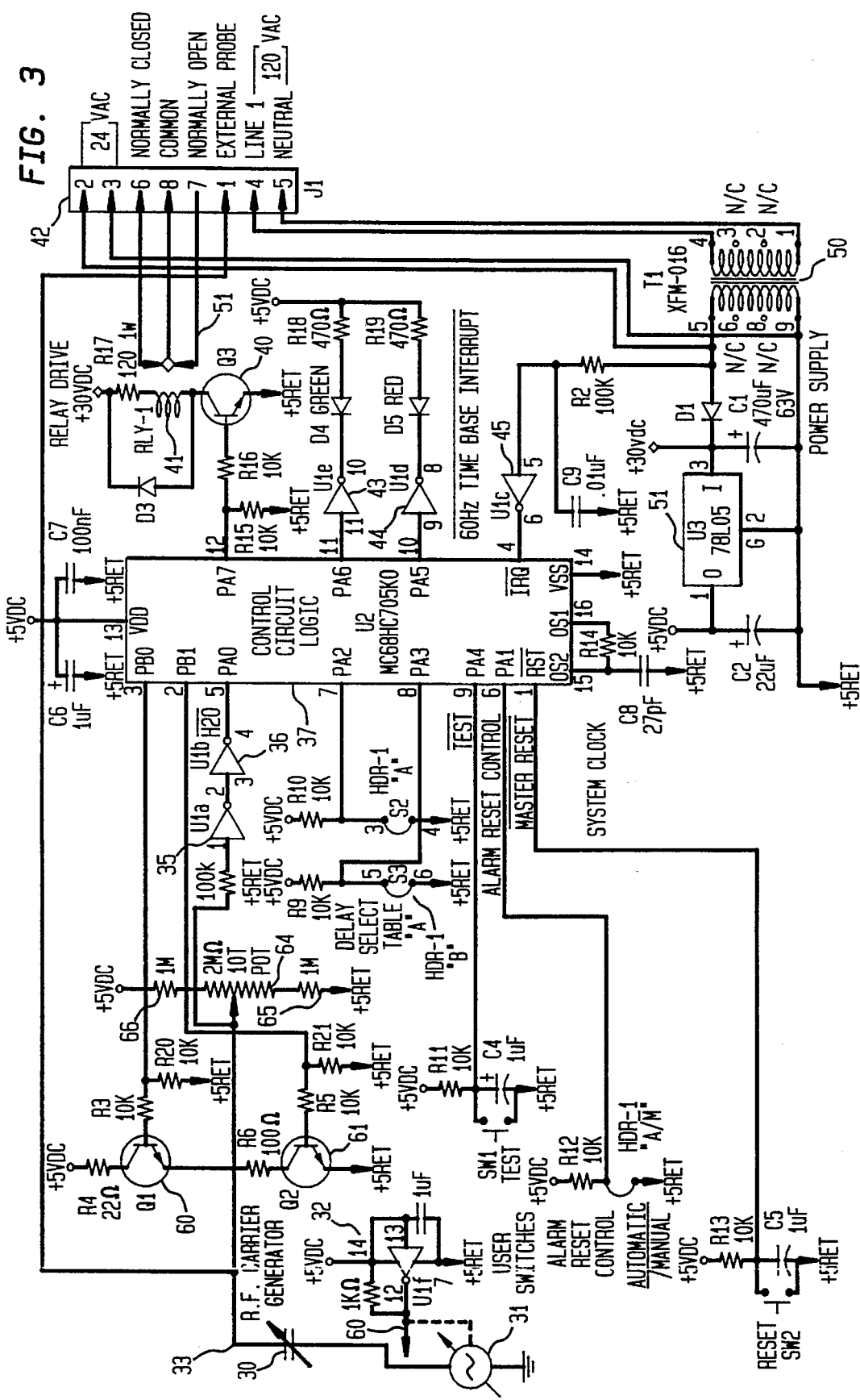
FIG. 3 is a detailed schematic diagram depicting a carrier frequency injection low water cutoff apparatus according to the present invention.

Referring to FIG. 3, there is shown a schematic diagram, specifying component values in certain instances, which depicts a control circuit operating with carrier frequency injection as for example shown in the block diagram of FIG. 2. Many of the operational aspects of the system will be clearer upon a review of FIG. 3 and the accompanying description. As shown in FIG. 3, a capacitor 30 which represents the probe is shown as a variable capacitor due to the fact that the capacitance of the probe may vary according to the application. As indicated, the capacitance of the probe 30 when selected is essentially constant due to the fact that the probe surface area does not change. If conductive failure material were built-up or applied to the surface of the probe, it would not substantially increase or decrease the capacitance of the probe. However, when the probe is out of the fluid, the capacitance 30 would not receive the injected signal from the fluid. The injected signal coupled to the probe 30 is depicted in FIG. 3 as variable generator 31. The generator 31 is fictitious in the sense that a carrier frequency signal is injected into the fluid by means of an external oscillator which in this case is oscillator 32. Oscillator 32 essentially performs the function of FET 27 shown in FIG. 2. While the oscillator 32 is a self-contained oscillator including an RC feedback circuit, the oscillator frequency can be implemented by means of the control circuit logic 37. Control circuit logic 37 is a control computer and utilizes a Motorola microprocessor chip MC68HC705K0. This chip is a self-contained microcomputer and is well-known to those skilled in the art. The amplitude of the carrier frequency signal which is coupled via capacitor probe 30 to the input terminal 33 of the control circuit is a function of the conductance of the fluid and other factors as well. A suitable range of signals can be ascertained and determined by ordinary experimentation and observation. Suitable frequency ranges for conductive fluids as water and so on can be between 30 KHZ and 2 MHZ. This range can also vary depending upon the capacitance of the probe and other system considerations. Terminal 33 is coupled to the input of buffer circuits 35 and 36 which may be amplifying devices or may be Schmitt trigger devices. The buffers 35 and 36 will provide a signal at the output which is coupled to terminal 5 of the control circuit 37 indicative of whether or not an adequate magnitude carrier signal is coupled to the probe. This signal is indicative of whether or not the probe is immersed or not immersed in fluid as will be explained. The circuits 35 and 36 can include a variety of circuits such as comparators, threshold detectors and so on which essentially provide a signal at one level when a certain amplitude input frequency signal is received and a signal at another level when such a signal is not received. The preferred embodiment for circuits 35 and 36 is the Schmitt trigger. The Schmitt trigger is a special class of a gate. The device operates such that as the input voltage increases, the output voltage does not begin to switch until a given level of input is achieved. As the input continues to increase the output switches to a low state. To turn the device off the circuit starts from a given high point and decreases. The devices have an input hysteresis. There are many versions of Schmitt triggers available. The Dual Schmitt trigger and the Hex Schmitt trigger are two examples in the CMOS family. Other circuits for detection can also be used. Essentially, water detection is provided by the Schmitt trigger which provides a "high" signal (1) on no water and a "low" signal (0) on water detection. The control circuit or microprocessor 37 functions to selectively activate a transistor 40 at one output terminal designated as PA 7. The transistor 40 has its collector electrode coupled in series with a relay coil 41 associated with relay contacts 51. The contacts 51 are connected to teals 6, 8 and 7 of terminal board 42 and designated respectively as the normally closed (NC), the common (C) and normally open (NO) position. Hence, the relay contacts form a single pole, double throw (SPDT)

switch which can be utilized to control devices such as pumps, gas burners and so on. As seen output terminals PA6 and PA5 of the control circuit logic 37 operate to energize amplifiers or trigger devices 33 and 34 which illuminate a green and a red LED to provide various alarm conditions as will be explained. Also shown, are transistors 60 and 61 connected to circuit terminal 33 and which operate to perform a test analysis to determine whether or not the probe is operational. Transistor 60 is a npn device having the emitter electrode coupled to terminal 33, having the collector electrode directed through a resistor R4 to the +5 volt VDC supply. Transistor 61 is also a npn transistor having the emitter electrode coupled to the +5 volt RETURN (RET) and the collector electrode coupled to terminal 33 through a collector resistor R6. The junction between the emitter electrode of transistor 60 and one terminal of resistor R6 is directed to the variable arm of potentiometer 64 which forms part of a voltage divider between the +5 volt supply and reference potential in order to adjust the biasing of the buffers. It is noted that the voltage divider serves as a ground return for transistor 60 via resistor 65 and the potentiometer 64. However this is an extremely high impedance path as resistor 66 is 1,000,000 ohms. Similarly, the collector electrode of transistor 61 is returned to the +5 volt supply via resistor R6 (1000Ω) and the large resistor 66 (1MΩ). This provides a DC bias for the buffers which as indicated can be Schmitt triggers. The buffers will trigger or provide a level at the output when a sufficient threshold voltage is exceeded at the input. This transition informs the control circuit logic 37 of a change of state of the capacitor probe 30. The operation of some of the components will now be explained in order to gain a further understanding of this invention.

In order to comply with standard techniques utilized, in the boiler industry, power is applied to the circuit by connection to 120 VAC or to a 24 volt AC source. If 120 VAC is applied, current is routed from connector 42, pins 4 and 5, to an input transformer 50 which steps down the 120 volts appearing on the primary winding to 24 volts on the secondary. The 24 volts is rectified by means of a diode and regulated by a circuit module 51 to provide an output voltage of 5 volts DC. The 5 VAC source is designated in FIG. 3 by reference numerals A and B. The regulator circuit 51 is a conventional circuit chip which is the 78L05 and is available from many sources. If a 24 volt AC supply is selected it is applied to connector 42 via terminal pins 2 and 3 which are coupled directly to the secondary winding of the transformer 50 where again this voltage is regulated by means of chip 51 to produce the same +5 volt DC and return voltages at terminals A and B. It is of course understood that if the circuit is operated from 24 volts AC directly, then transformer 50 can be eliminated resulting in a decrease in circuit cost. The raw 24 volts AC supply is current limited by means of resistor R2 (100 k) which is directed to the input of a Schmitt trigger 45 (U1C). The U1C device is a zero crossing detector which essentially provides a 60 HZ reference interrupt signal to the control circuit logic 37 or microprocessor which signal is utilized for timing purposes. Such techniques are well-known in the state of the art and for example instruction manuals for the microprocessor 37 are available which describe the operation. As indicated, the control computer 37 designated also as U2 is a Motorola MC68HC705KO self-contained microcomputer chip. This chip provides all functions of control, timing, input/output, RAM, ROM and so on in a conventional 16 PIN DIP package. The internal timing is provided by capacitor C8 and resistor R14 connected to terminals OS1 and OS2 which provide a reference timing signal of approximately 4 Megahertz (MHZ). Reset control is provided by timing network R13 and C5 which are connected to the master reset terminal 1 of the computer (RST). As seen in FIG. 3, capacitor C5 is associated with a momentary reset switch SW2 which can reset system operation.

The generation of the radio frequency carrier is accommodated by the feedback amplifier 32 which consists of operational amplifier U1F and associated components. This configuration provides an RF signal of 1 MHZ. The power output of the oscillator 32 is limited to approximately 10 milliwatts. This power is well below FCC radiated noise certification requirements. The output of the oscillator on lead 60 is induced into the fluid by means of the connection to the boiler tank or the vessel, either by an external ground connection or through the probe to the tank interface. The radiated power cannot escape from the vessel system due to the fact that the earth potential of the vessel system, such as the boiler, creates a "Faraday Cage" shield to stop or inhibit radiated power. Further, the RF signal is not "short circuited" to earth potential due to the electrical isolation between the earth and the low voltage power supply connection. As shown in FIG. 2 and as described above, water detection or fluid detection is accomplished by submersion of the insulated probe into the boiler water contained in the vessel at the desired detection level. The probe may be positioned either in a horizontal or vertical orientation as the position of the probe is not essential to operation. For any given insulated probe, a net capacitance will result when submerged in a conductive medium. The conductivity of the medium is not relevant to operation due to the fact that even poor conductors are transparent to RF energy at frequencies in the desired range as 1 Hhz or greater. The combination of the fixed frequency and fixed capacitance provide a tuned circuit with other systems components. Thus, when the entire probe is immersed in water, the circuit is tuned and the received resonant carder frequency is coupled into the junction of transistors 60 and 61 at terminal 33. The junction between transistors 60 and 61 is at a very high impedance point allowing the low power carrier signal to enter the input of the buffer 35. When the carrier frequency has reached proper resonance by the complete coupling of the probe in water, the buffer output 36 goes to the low or ground state applying that signal to the input terminal 5 of the computer 37 (PAO). The computer 37 will then apply normal discrimination logic and debounce control as directed by the software and user selected delay straps located on the microprocessor at pins 7 and 8 (PA2 and PA3). As can be seen these values are determined by resistors R9 and R10 and enable the operator to select different values of delay operation.

The circuit described has another extremely important advantage which is the ability to discriminate between foam and "probe fouling". This is accomplished by the attenuation of the RF carrier signal when it does not reach resonance. The ability to discriminate against foam as compared to actual liquid level and "probe fouling" occurs because of two distinct operating principles both of which work in concert. When the capacitance probe is immersed in foam, there is a given amount of air contacting the probe surface as foam is mainly gas or air bubbles. Air is an insulator to the RF energy which attenuates signal strength. Even though air is a dielectric, it is a poorer dielectric than the fluid which is a conductive material. The foam which consists of multiple bubbles is on the top surface of the liquid and constitutes mainly air. Air reduces the capacitance of the probe by effectively reducing the conductive surface area of the probe. The probe, as indicated above, acts as a capacitor plate. Once the conductive surface of the plate decreases the capacitance decreases and the signal coupled via the fluid substantially decreases. This level can be detected.

If the insulating material, which surrounds the sensing probe, fails for any reason, normal conductive water sensing logic can and is applied as follows. Conductive water detection is made up of the components associated with the Schmitt triggers 35 and 36. This circuit provides an active high signal on no water detection and an active low signal on water detection. The probe signal is AC coupled in water to prevent galvanic corrosion of the probe. Thus, if the insulation of the probe fails, then the probe wire 23 which is conductive is in direct contact with the water and of course an AC signal will be coupled to the probe. The probe is now essentially a short circuit, due to the fact that it is no longer insulated from the conductive fluid. Testing of the probe condition is accomplished by transistors 60 and 61 and the associated components. The test is performed by and under the control of the microprocessor 37 as follows. The base electrode of transistor 60 (Q) is coupled to terminal 3 (PBO) of the microprocessor 37. The collector electrode of transistor 60 (Q1) is coupled through R4 to the +5 volt DC source. The emitter electrode of transistor 60 is coupled to the probe 30 input at terminal 33. Hence, if transistor 60 is rendered conductive, the emitter electrode of transistor 60 should go to the +5 volt DC level if the probe 30 acts as a capacitor and cannot conduct DC current. If the probe, is at a low indicating that water is present activating transistor 60 (Q1) should be able to pull the probe voltage high (+5 volts) or to the out of the water state. Thus, by activating transistor 60 if the probe is in water and is acting as a capacitor, the emitter voltage should go to +5 volts. If the probe is a short circuit, then Q1 which has a low impedance compared to the water impedance will not be able to make the probe voltage go high. This indicates that the probe must be shorted or nearly shorted to ground indicating a failure. As can be seen, if terminal 33 is at ground potential indicating a failed probe, then the voltage at the emitter electrode of Q1 can never be pulled to +5 volts thus indicating that the probe is shorted. In a similar manner, a probe shorted to the +5 volt DC supply will also not be able to change state. This is determined by activating transistor 61. The base electrode of transistor 61 is coupled to terminal 2 (PB 1) input of the processor 37. The emitter electrode of transistor 61 is coupled to the +5 volt RET and the collector electrode is coupled to terminal 33 via resistor R6. Thus, when transistor 61 is activated by a positive voltage at the base electrode, if the probe is connected to the +5 volt supply, the transistor 61 cannot pull the probe to ground level as the voltage at the collector electrode will equal the voltage at the emitter electrode. Thus, there can be no transition for a probe which is shorted to the high voltage. In this manner, one can now determine whether or not there is a short in the probe in either state. These tests determine that a new probe has to be inserted because either the probe is not covered by insulation (shorted) or there is a high voltage short in the probe.

In summation, a circuit is shown whereby an injected radio frequency will efficiently couple through the capacitor probe when the fluid completely covers the probe. The circuit will prevent the detection of fluid in the vessel when the vessel is filled with foam or only partly filled with fluid. This operation is due to the fact that foam contains a variable percentage of gas bubbles or air which when in contact with the dielectric/electric plate junction form only a percentage of the total capacitor plate area. This will reduce the capacitance of the sensor and the circuit will not be in resonance and the proper level carrier signal will not couple through the capacitor and fluid and thus will not be detected by the electronic circuit. The circuit as described is a fluid sensing circuit which can discriminate between fluid and foam or "probe fouling" to ensure a fail proof detection system as compared to those systems depicted in the prior art. The system due to the microprocessor 37 provides a programmable delay on make (DOM) for the relay 41 which can be varied as desired and essentially controls the make time of the relay as controlled by transistor 40 which is controlled by the microprocessor. The microprocessor has suitable terminals and arrangements so that a suitable delay can be selected by means of resistors R9 and R10 and the voltages applied thereto. Similarly, the system can have a programmable delay on break (DOB) between 0 to 10 seconds. The system can provide selectable manual or automatic reset of the relay 41 when the water level is reapplied to the circuit by means of the ALARM RESET CONTROL coupled to terminal 6 (PA1) as well as the MASTER RESET coupled to terminal (RST). As indicated above, an input voltage of 120 volts AC or 24 volts AC can be implemented simply and easily. There is shown a manual test button (SW1 TEST) which fully tests the microcomputer and the sensing probe and is designated as TEST which is applied to terminal 9 (PA3) of the microprocessor 37. SW1 is a momentary switch will cause the microprocessor to step through manual tests emulating proper operation. The microprocessor provides automatic background diagnostics which automatically tests all the electronic circuits and activates transistor 60 and 61 during desired intervals to test for probe failure and so on.

The carrier frequency technology described ensures complete fault tolerance as, "foul probe" and foam sensing and failed probe detection which are not available utilizing prior art technology. Utilizing the above techniques, there are many relay reset options which can be implemented depending upon the nature of the system being employed. For example, for a boiler type system and for low water operation, when the probe loses water contact, the computer 37 instructs the relay 41 to turn off. When water is reapplied to the probe, the computer can perform any of the following functions.

AUTOMATIC RESET. During this mode, the computer will energize the relay after a suitable delay, if any, or in a manual reset, the computer will not energize the relay until the user presses the RESET button. This manual or automatic reset is under the control of whether or not the strap called ALARM RESET CONTROL associated with resistor R12 is selected. The user can select any one of four delays. Delay on make (DOM) or delay on break (DOB) timing options are again selected by delay straps as, for example, shown in conjunction with resistors R9 and R10. The output indicators provide a GREEN LED associated with amplifier 43 which is the OK LED and which is continuously on when the unit is detecting water and power is applied to the unit. The RED LED which is associated with amplifier 44 is a flashing low water LED and indicates that the circuit either failed a user requested test or that the unit detected a fault under normal operations. Detectable faults include a probe shorted to ground or shorted to the supply voltage, a defective buffer or other control logic failure. There is a condition designated as low water/fault where the RED LED is on solid. This condition indicates that the circuit is operating properly, but the sensing probe is not in water. During this time, the RED LED is continuously lit and is not blinking.

Test switch SW1 connected to terminal 9 causes the circuit to conduct a series of diagnostic self tests. When this switch is pressed, the computer 37 turns off the LED's and the control relay. The software will test the computer chip, the probe and support electronics. If the test is passed, the GREEN LED will flash and the unit will enter normal operation automatically. If the test fails, the control relay 41 will remain off and the RED LED will flash continuously until the unit is RESET by pressing the reset button and the fault is cleared. The background diagnostic routines are run once per minute. The probe test hardware will ensure that the sensing probe and its associated hardware is running properly. If there is a failure, the circuit will be reset, the relay turned off and the RED LED will flash continuously until the program is corrected.

Water sensing is based on the carrier frequency utilizing a capacitive probe and as indicated, the object is to ensure a fault tolerant, fail safe water sensor that is not effected by water foam, probe fouling, or probe shorts.

Other alternative structures, configurations and equivalents will become apparent to those skilled the art.

We claim:

1. A liquid level detection apparatus for monitoring the level of a fluid volume in a storage tank or vessel, comprising:

a capacitive probe positioned at a given level in said vessel indicative of a desired fluid level at which said probe is immersed in said fluid volume at said level;

means for injecting a carrier frequency signal into said fluid volume as contained in said vessel to cause said carrier frequency signal to propagate through said fluid volume to said probe;

circuit means coupled to said probe for monitoring the presence of said carrier signal and responsive to the amplitude of said signal to provide a control signal when said amplitude is below a given value.

2. The apparatus according to claim 1, wherein said probe is a conductive wire surrounded by an insulator layer to form one plate of a capacitor with said fluid volume forming another plate of said capacitor.

3. The apparatus according to claim 1, wherein said carrier frequency signal is selected to be in resonance with the capacitance value of said probe when said probe is completely immersed in fluid.

4. The apparatus according to claim 1, where said circuit means coupled to said probe further include means for providing an operating signal during the presence of a carrier signal of an amplitude above said given value.

5. The apparatus according to claim 1, wherein said vessel is a steam boiler and said fluid volume is water.

6. The apparatus according to claim 1, further comprising test means coupled to said probe and operative to apply a signal to said probe to monitor the operating conditions of said probe and to provide an output indicative of probe operation.

7. The apparatus according to claim 1, wherein said circuit means for monitoring the presence of said carrier signal includes a microprocessor.

8. The apparatus according to claim 7, wherein said microprocessor generates said carrier signal to be injected in said fluid volume.

9. The apparatus according to claim 8, wherein said carrier frequency signal is selected between 30 Khz to 2 Mhz.

10. The apparatus according to claim 9, wherein said carrier frequency signal has a power of about 10 milliwatts at a frequency of 1 MHz.

11. A method of monitoring the fluid level contained in a vessel or storage tank, comprising the steps of:

placing a capacitive probe at a desired level, said probe indicative of the desired level in said vessel and immersed in a fluid;

injecting a carrier frequency signal into said fluid causing said carrier signal to propagate to said probe;

monitoring the level of said carrier frequency signal received by said probe; and providing an indication when said monitored level falls below a predetermined value.

12. The method according to claim 11, further comprising the step of:

selecting said carrier frequency signal at the resonant frequency of said probe, when said probe is immersed in said fluid.

13. The method according to claim 11, wherein said carrier frequency signal is between 30 khz and 2 mhz.

14. The method according to claim 13, wherein said vessel is a stem boiler, and said fluid is water.

15. The method according to claim 14 including the step of:

applying test signals to said probe to determine proper operating condition.

16. The method according to claim 15, wherein said probe is a conductive wire coated with a thin layer of insulating material.

17. The method according to claim 11, wherein said vessel is conductive and operates as a Faraday Cage.

18. The method according to claim 17, wherein said probe is placed relatively horizontal with respect to the fluid surface.

\* \* \* \* \*